(12) United States Patent
Cui et al.

(10) Patent No.: US 7,177,852 B2
(45) Date of Patent: Feb. 13, 2007

(54) METHOD AND APPARATUS FOR EXTRACTING KNOWLEDGE FROM SOFTWARE CODE OR OTHER STRUCTURED DATA

(75) Inventors: Zhan Cui, Colchester (GB); Yang Li, Ipswitch (GB); Hongji Yang, Loughborough (GB)

(73) Assignee: British Telecommunications public limited company, London (GB)

( * ) Notice: Subject to any disclaimer, the term of this patent is extended or adjusted under 35 U.S.C. 154(b) by 560 days.

(21) Appl. No.: 10/312,768

(22) PCT Filed: Jun. 28, 2001

(86) PCT No.: PCT/GB01/02907

§ 371 (c)(1),
(2), (4) Date: Dec. 30, 2002

(87) PCT Pub. No.: WO02/05088

PCT Pub. Date: Jan. 17, 2002

(65) Prior Publication Data

US 2003/0217023 A1    Nov. 20, 2003

(30) Foreign Application Priority Data

Jul. 6, 2000 (GB) .................................. 0016639.7
Aug. 30, 2000 (EP) .................................. 00307431

(51) Int. Cl.
*G06F 17/00* (2006.01)
*G06N 5/02* (2006.01)

(52) U.S. Cl. ...................................................... 706/46
(58) Field of Classification Search .................. 706/46
See application file for complete search history.

(56) References Cited

OTHER PUBLICATIONS

SRE: A Knowledge-based Environment For Large-scale Software Re-engineering Activities, Kozaczynski, W.; Ning, J.Q.; Software Engineering, 1989. 11th International Conference on May 15-18, 1989 pp. 113-122.*
An Evrironment for Software System Development, Jamsek, D. A; Suk, M.; SPIE vol. 937 Applications of Artificial Intelligence VI (1988).*

* cited by examiner

*Primary Examiner*—Anthony Knight
*Assistant Examiner*—Michael B. Holmes
(74) *Attorney, Agent, or Firm*—Nixon & Vanderhye P.C.

(57) ABSTRACT

A method for knowledge representation and management is disclosed which has particular but not exclusive application in knowledge recovery techniques. To help with program understanding, software maintainers use computer aided reverse engineering (CARE) tools which utilize techniques such as syntax analysis, structural analysis, and domain knowledge base analysis (DKBA). Known DKBA methods are complex since the domain knowledge recovery relies on the use of knowledge at different layers while some elements of the knowledge at domain level is not used at all. In the disclosed method for representing knowledge in a knowledge base, the knowledge is represented by a set of one or more concepts and by one or more first type of relationships between two or more or said concepts. The method comprises dividing the set of concepts into a plurality of sub-sets, each sub-set comprising a set of concepts related to a sub-set of the knowledge; dividing the relationships among the sub-sets of concepts; and providing a further set comprising all the concepts along with a second type of relationship that provides an association between each concept in the further set of concepts and one or more of the sub-sets of concepts and relationships.

15 Claims, 3 Drawing Sheets

METHOD AND APPARATUS FOR EXTRACTING KNOWLEDGE FROM SOFTWARE CODE OR OTHER STRUCTURED DATA

This application is the U.S. national phase of international application PCT/GB01/02907 filed 28 Jun. 2001 which designated the U.S.

BACKGROUND

1. Technical Field of Non-Limiting Exemplary Embodiments.

The present invention relates to knowledge representation and management and has particular but not exclusive application in knowledge recovery techniques.

2. Description of Related Art.

After decades of software development, the software industry has arrived at a point where a significant amount of software engineering effort is being spent on maintaining existing systems. Software maintainers spend a large proportion of their time developing an understanding of the software being maintained. One reason for this is that software documentation is often inadequate or unreliable. As a result, source code itself is often the only reliable source for developing understanding of the software. The knowledge of functions and performance of the software is referred to as domain knowledge.

To help with program understanding, software maintainers use computer aided reverse engineering (CARE) tools which utilise techniques such as syntax analysis, structural analysis, and domain knowledge base analysis (DKBA). Known DKBA methods are complex since the domain knowledge recovery relies on the use of knowledge at different layers while some elements of the knowledge at domain level is not used at all. This makes these methods inefficient. Furthermore, the current techniques and systems do not address issues such as knowledge representation, uncertainty reasoning and program space management in the context of domain knowledge recovery from source code or other structured data.

SUMMARY OF NON-LIMITING EXEMPLARY EMBODIMENTS

Embodiments of the present invention provide a method for representing knowledge in a knowledge base, the knowledge being represented by a set of one or more concepts and of one or more first type of relationships between two or more or said concepts, the method comprising the steps of:
  a) dividing the set of concepts into a plurality of sub-sets, each sub-set comprising a set of concepts related to a sub-set of the knowledge;
  b) dividing the relationships among the sub-sets of concepts; and
  c) providing a further set comprising all the concepts along with a second type of relationship that provides an association between each concept in the further set of concepts and one or more of the sub-sets of concepts and relationships.

One advantage of this method of representing knowledge is that it provides a structure that enables easier and more efficient belief revision and/or propagation. The method may also be combined with heuristic search techniques to improve the efficiency of belief initialisation and belief propagation. Elements of programming psychology may be used as an efficient way to decide good searching path for belief propagation. The method may also be used with a program partitioning method based on personal programming styles to partition source code into smaller self-contained functional modules for reducing the search space for data analysis.

BRIEF SUMMARYU OF DRAWINGS

Embodiments of the present invention will now be described with reference to the accompanying drawings in which.

DETAILED DESCRIPTION OF NON-LIMITING EXEMPLARY EMBODIMENTS

Figure 1:
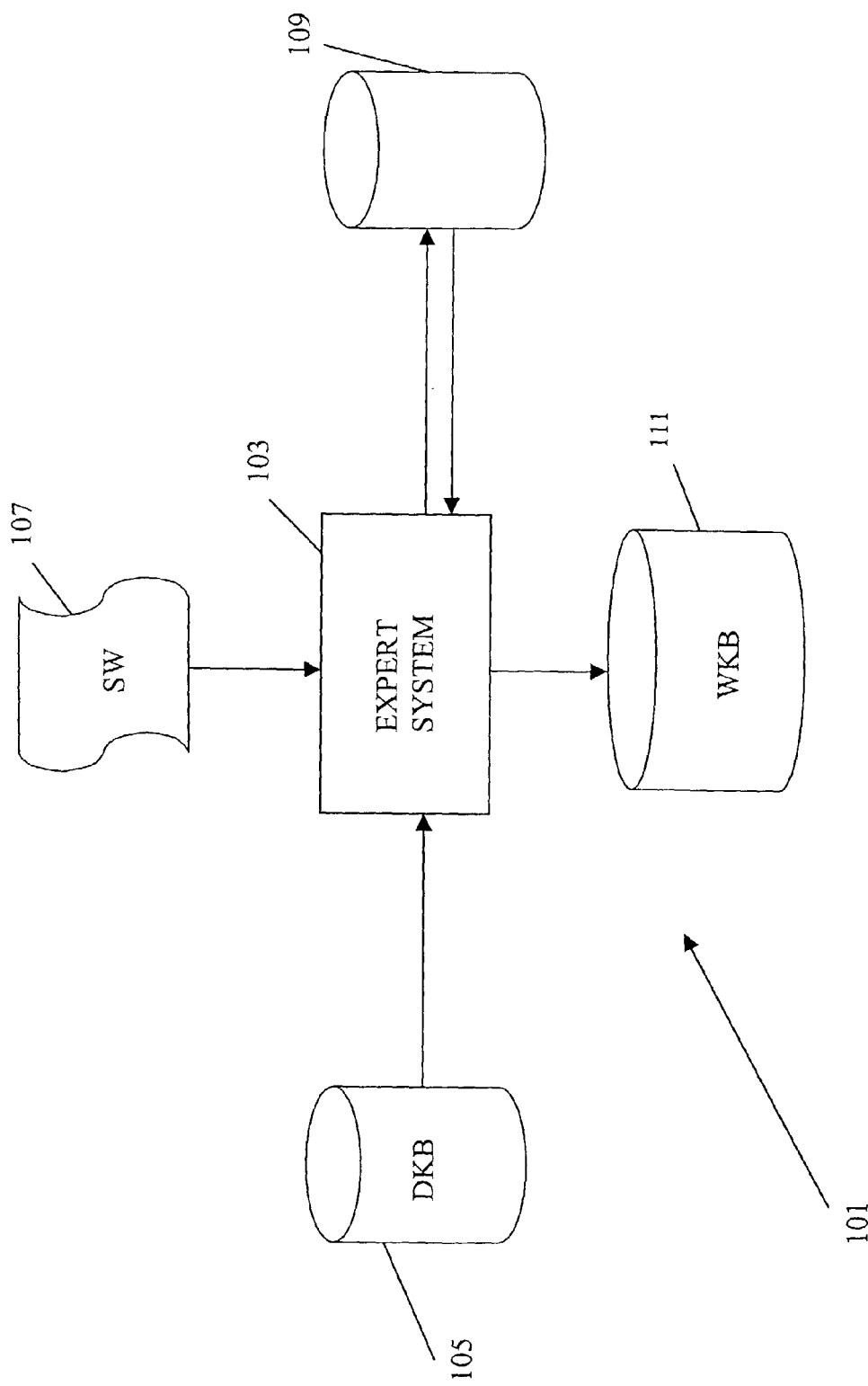
FIG. 1 is a schematic representation of an system for extracting domain knowledge from software code or other data.

FIG. 1 is a diagrammatic representation of a system 101 for extracting domain knowledge from software code or other data which comprises an expert system 103. The expert system 103 is conventional and comprises an inference engine and a blackboard (both not shown) which are both known elements of expert systems. The blackboard contains initial, intermediate and final data during a reasoning session and the inference engine fetches data from the blackboard, refers to knowledge in a domain knowledge base 105, makes inferences and puts the result into the blackboard.

The present embodiment is arranged to recover or identify domain knowledge i.e. knowledge about the software application domain, that is embedded in software 107. The knowledge in the domain knowledge base 105 represents an expert's knowledge e.g. the engineer who is the maintainer of the software system of which the software 107 is a part. The system 101 is arranged to check the software 107 against the expert knowledge 107 of the software system and identify information from the software 107 that conforms to a predetermined degree with that of the expert (with a believability measure that will be explained in detail below).

The input to the expert system 103 is the software source code 107 and the domain knowledge base 105 as noted above. In addition, the expert system 103 also uses a set of name recovery rules, relationship recovery rules and a data dictionary which are stored in a database 109. These rules and the dictionary are used by the expert system 103 in identifying elements in the software 107. Their origins and functionality will be explained in further detail below.

The output of the expert system is working knowledge base 111 which is a sub-set of the domain knowledge base 105 and includes a set of linkages between the source code 107 and elements in the working knowledge base 111. The linkages indicate the part of the software 107 which have been identified as conforming to the knowledge of the expert held in the domain knowledge base 105. In other words, the working knowledge base 111 provides a user with knowledge or information about the functionality of the software 107 without the user needing to consult the software 107 itself. This knowledge or information can be used for re-implementing the software 107 using newer programming technology, to maintain the software 107 or to implement other systems which require that knowledge or information for their design.

The knowledge base 105 is provided in the form of a semantic network. A semantic network is a set of concepts made up of objects and actions linked together by a set of interrelationships. In other words, if SN is a semantic network, SN=(N, E), where N denotes the total set of concepts and E denotes the total set of relationships among these concepts, N is classified into two kinds of concepts, i.e. objects and actions. Objects represents things such as class, instance, features while actions represent operations or events which occur among several objects. The actual things which the objects and actions are mapped on to depends on the knowledge that the semantic network is being used to represent. E is classified into the relationships between objects and objects, objects and actions, actions and actions. Table A below shows examples of relationships in each category.

TABLE A

Relationship examples in a semantic network

| | Relationships examples |
|---|---|
| Objects-objects | Instance-of, part-of, etc. |
| Objects-actions | Receiver-of, sender-of |
| Actions-actions | Sub-plan-of, precedent-of, etc. |

In the present embodiment, the domain knowledge base is sub-divided into a plurality of parts or knowledge slices. A domain knowledge slice is defined as a set of strongly related domain concepts linked by a set of relationships among these concepts. Multiple domain knowledge slices could exist for a single set of domain concepts depending on the number of different group of relationships among these concepts. Domain knowledge is therefore regarded as a collection of domain knowledge slices which are linked with each other through common concepts.

In other words, the classic semantic network has been divided into a two-layer network, a concrete semantic network and an abstract semantic network. The concrete semantic network contains one or more knowledge slices which hold the detailed information on concepts and their relationships as noted above. The abstract semantic network contains only domain concepts and links to knowledge slices within the concrete semantic network and thereby acts as a connection among the knowledge slices that make up the concrete semantic network. The abstract semantic network provides an infrastructure for belief propagation while the concrete semantic network provides an infrastructure for belief revision. Belief revision and propagation will be explained in further detail below.

Figure 2:
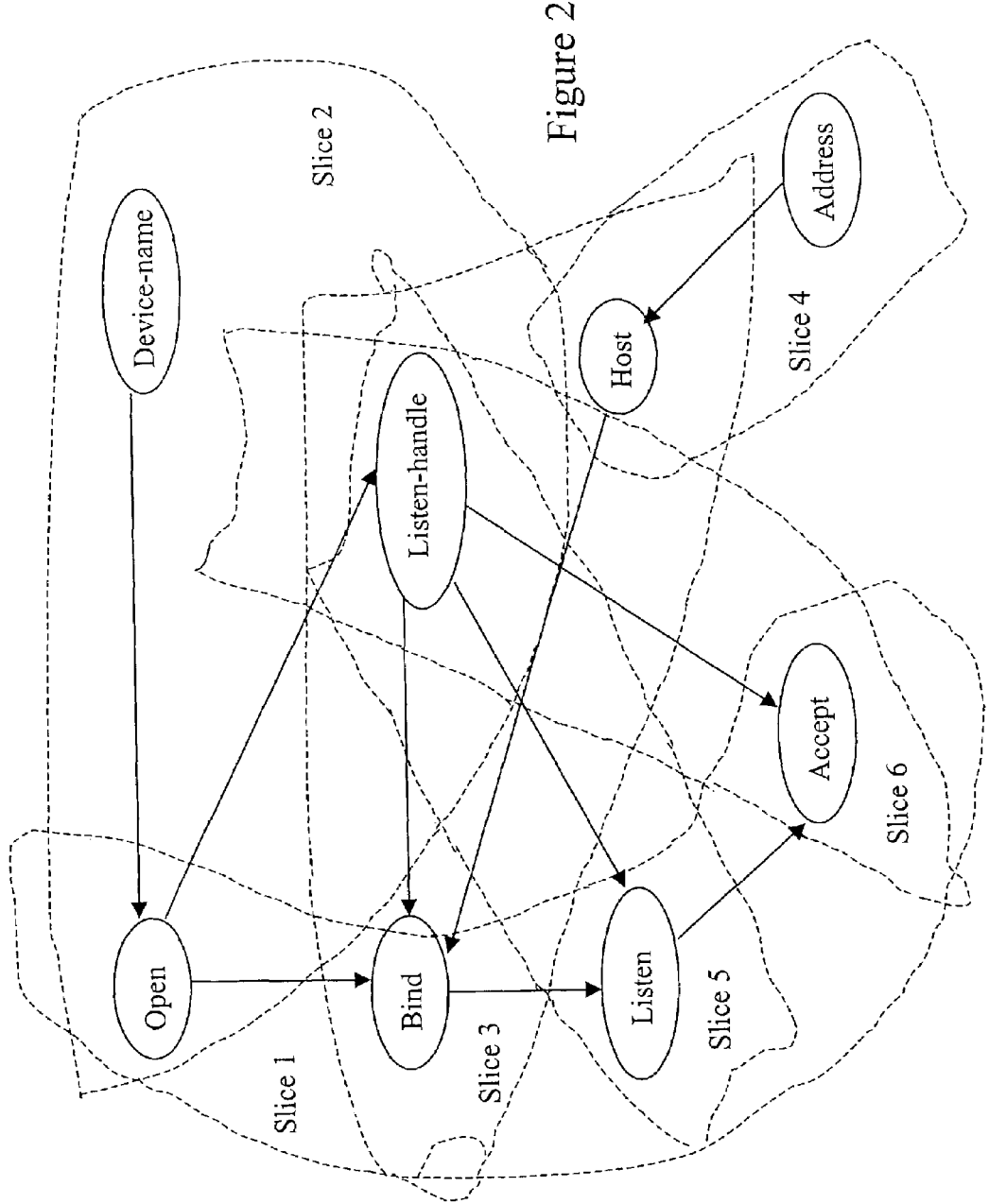
FIG. 2 is a diagrammatic representation of knowledge in a knowledge base used in the system of FIG. 1.

The creation of the domain knowledge base and its segregation into the knowledge slices is carried out during a knowledge acquisition process. During this process the domain expert's knowledge is obtained (such as the knowledge of engineer maintaining the software system of which the software 107 forms a part). The division of the knowledge is carried out with the aid of the following subjective criteria:

(1) each knowledge slice should contain a meaningful knowledge;

(2) each knowledge slice should contain tightly coupled knowledge which make the knowledge slice easier to be completely matched, i.e., should not contain too much incoherent information which generally fails the matching of the knowledge slice;

(3) each knowledge slice should contain a moderate scale of domain context, i.e., (concept1, concept2, relationship1(concept1, concept2)) is too simple to provide a meaningful context. Well-sliced knowledge slices can be fused together to form larger context FIG. 2 shows an abstract semantic network in telecommunication domain. Both concrete semantic network and abstract semantic network are predefined by human and stored in domain knowledge base 105. A fraction of domain knowledge base 105 which relates to the knowledge of the software system of which the software 107 is a part is set out below. It represents some domain knowledge for a Unix system as shown in *Unix System V Network Programmer's Guide*, Prentice-Hall, 1987. In particular, the knowledge set out below relates to the functions of a Connection-mode Server. The concrete semantic network has been defined as follows in table 1:

TABLE 1

Concrete semantic network

Knowledge Slice 1:

Open(A1"), Bind(A2"), Listen(A3"), Accept-call(A4"),
R-before"(A1", A2"), R-before"(A2", A3"), R-before"(A3", A4"),
CS(A1", 0.10), RS(A1", 0.10),
CS(A2", 0.15), RS(A2", 0.15), CS(A3", 0.5),
RS(A3", 0.15), CS(A4", 0.15), RS(A4", 0.15),
CS(R-before"(A1", A2"), 0.10), RS(R-before"(A1", A2"), 0.40),
CS(R-before"(A2", A3"), 0.15), RS(R-before"(A2", A3"), 0.40),
CS(R-before"(A3", A4"), 0.6), RS(R-before"(A3", A4"), 0.50)

Knowledge Slice 2:

Open(A1"), Device-name(O1"), Listen-handle(O2"),
R-source-of"(O1", A1"), R-destination-of"(O2", A1"),
CS(A1", 0.10), RS(A1", 0.10), CS(O1", 0.10), RS(O1", 0.10), CS(O2", 0.10), RS(O2", 0.10),
CS(R-source-of"(O1", A1"), 0.20), RS(R-source-of"(O1", A1"), 0.20), CS(R-destination-of"(O2", A1"), 0.50), RS(R-destination-of"(O2", A1"), 0.50)

Knowledge Slice 3:

Bind(A2"), Listen-handle(O2"), Host(O3"),
R-source-of"(O2", A2"), R-source-of"(O3", A2"),
CS(A2", 0.10), RS(A2", 0.10), CS(O2", 0.10),
RS(O2", 0.10), CS(O3", 0.10), RS(O3", 0.10),
CS(R-source-of"(O2", A2"), 0.4), RS(R-source-of"(O2", A2"), 0.4),
CS(R-source-of"(O3", A2"), 0.4), RS(R-source-of"(O3", A2"), 0.4)

Knowledge Slice 4:

Host(O3"), Address(O4"),
R-part-of"(O3", O4"),
CS(O3", 0.10), RS(O3", 0.1), CS(O4", 0.10), RS(O4", 0.10),
CS(R-part-of"(O3", O4"), 0.9), RS(R-part-of"(O3", O4"), 0.9)

Knowledge Slice 5:

Listen-handle(O2"), Listen(A3"),
R-source-of"(O2", A3"),
CS(O2", 0.10), RS(O2", 0.10), CS(A3", 0.10), RS(A3", 0.10),
CS(R-source-of"(O2", A3"), 0.9), RS(R-source-of"(O2", A3"), 0.9)

Knowledge Slice 6:

Listen-handle(O2"), Listen(A4"),
R-source-of"(O2", A4"),
CS(O2", 0.10), RS(O2", 0.10), CS(A4", 0.10), RS(A4", 0.10),
CS(R-source-of"(O2", A4"), 0.9), CS(R-source-of"(O2", A4"), 0.9)

We can see that the concrete semantic network detailed above contains six slices. Each slice contains concepts and relationship each with associated contribution strengths and refutation strengths. Each concept is represented by a name and then a code in brackets. The name is the label most commonly used (in the opinion of the expert) to refer to the relevant concept in the Unix system i.e. in the relevant domain. The concept can either be an object, such as a variable or a constant in the software, or it can be an action such as a procedure call or other element of processing. In the concrete knowledge base notation, each concept is given a unique identifier (the code in brackets after the concept name). If the concept is an object it has a code beginning with "O" while if the concept is an action is has a code beginning with "A".

There are a number of different relationships which exist between the objects and/or actions which have the following labels: R-before, R-source-of, R-destination-of, R-part-of. Each relationship also gives an indication of the-concepts (object and/or actions) that are involved in the relationship by referring (in brackets after the name of the relationship) to the unique identifier of the concept. For example, the relationship R-before refers to two actions and indicated that the first identified action occurs in the software processing before the second identified action. R-source-of indicates that the identified action is the source of the identified object. R-destination-of indicates that the identified object will be used or required in the identified action. R-part-of identifies two object and indicates that one of the object is part of the other.

As noted above, each concept and each relationship also has a contribution strength (CS) and a refutation strength (RS). These are represented as numbers between zero and one and are used indication of the expert's level of belief in the associated concept or relationship. One indicates full confidence while zero indicated no confidence. These values are used in later analysis in the system when concepts and relationship are compared during belief revision and/or propagation which will be described in further detail below. The contribution strength indicates the level of belief that will be attributed to the concept of relationship if it is confirmed by some external evidence or expert knowledge while the refutation strength comes in to play if the concept or relationship is refuted in the same manner. Again, these elements will be explained in further detail below.

The corresponding abstract semantic network has been defined as follows in table 2:

TABLE 2

Concepts:

Open(A1"), Bind(A2"), Listen(A3"), Accept-call(A4"), Device-name(O1"), Listen-handle(O2"), Host(O3"), Address(O4").

Abstract Relationships

Abs-R1A1", A2", A3", A4"), Abs-R2(A1", O1", O2'),
Abs-R3(A2", O2", O3'), Abs-R4(O3", O4"), Abs-R5(O2", A3"),
Abs-R6(O2", A4").

Abstract semantic network contains only the concepts (which are also in each knowledge slice of the concrete semantic network) and each concept uses the same unique identifier. The abstract semantic network also shows a number of abstract relationships "Abs-Rn(x)" where n is a number to uniquely identify the abstract relationship and x is a list of one or more unique identifiers of the concepts. These abstract relationships maintain the link between the abstract semantic network and the knowledge slices in the corresponding concrete semantic network. For example, Abs-R6(O2", A4") relates to knowledge slice 6 and indicates that the concepts Listen-handle and Listen are involved in that slice. FIG. 2 shows a graphic version of the abstract semantic network's concepts as well as indicating the knowledge slices that they are included in and the relationships between the concepts.

Figure 3:
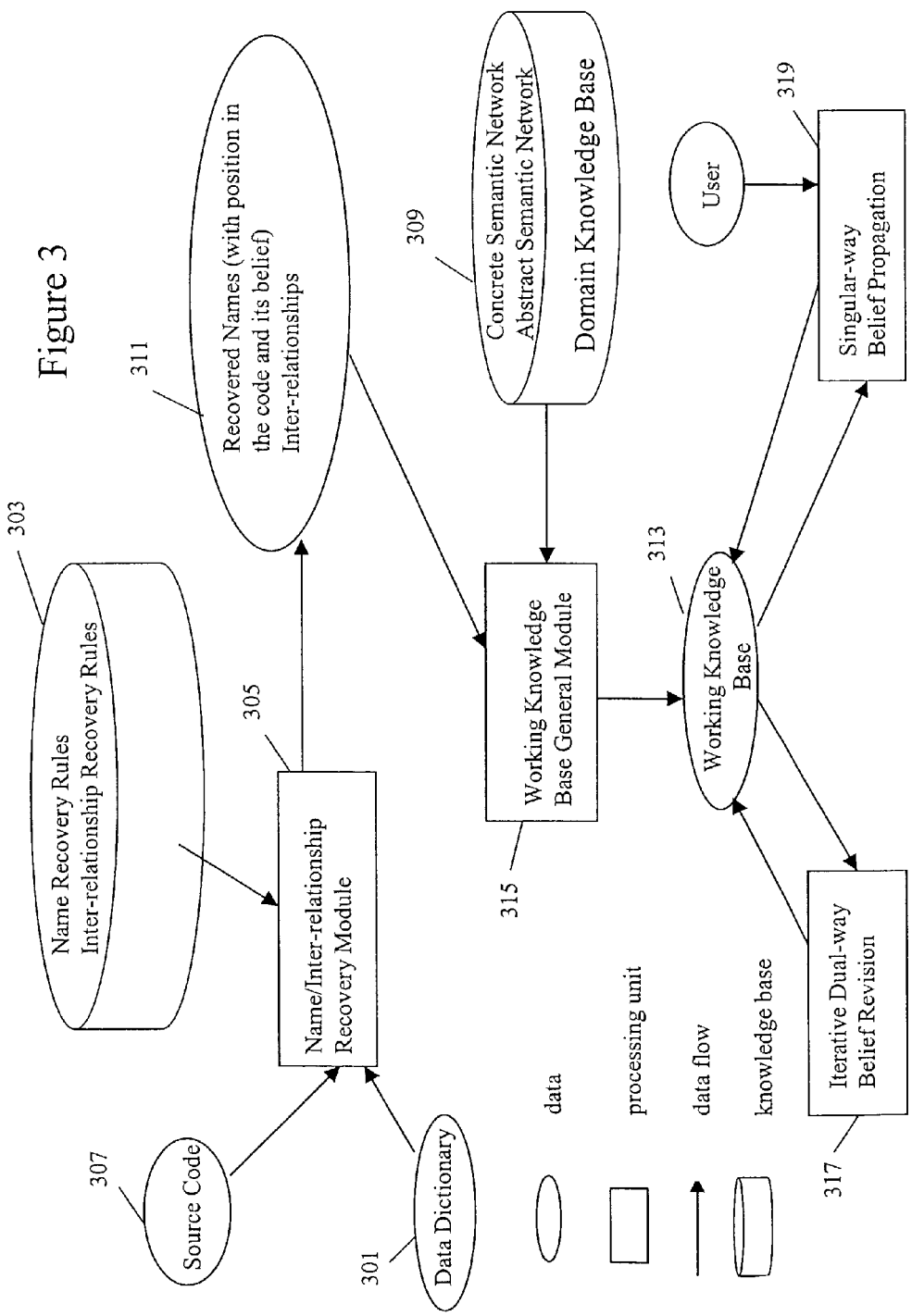
FIG. 3 is a schematic representation of the processing carried out by the system of FIG. 1 including indication of the data used and created.

With reference to FIG. 3, the first step in the analysis of the software 107 is to create a data dictionary 301 which contains a copy of the each of the labels used for every concept in the domain knowledge base (i.e. the abstract and concrete semantic networks). The data dictionary is then used in conjunction with name recovery rules and relationship matching rules 303 by a name/relationship recovery module 305 to search the software 307 (107 in FIG. 1) for concepts and relationships which, at least to some degree, correspond to the concepts and relations in the domain knowledge base 309 (105 in FIG. 1). The software 307 code may be written in any programming language which is first fed into the name/relationship recovery module 305 so long as the name recovery rules and relationship recovery rules 303 are arranged to recover appropriate names and relationship in the particular language.

The procedure of name recovery is starts at the beginning of the code and scans to the end. In the present embodiment, the name matching rules 303 are designed to only attempt to match the names of variables and procedures in the software 307. After a name recovery rule has been successfully applied, an initial belief is endorsed in a linkage between the name and the concept it is matched with. The linkage is maintained by recording the position of the name in the software 307. For a procedure name, the position is where the procedure call occur in the software 307. A variable name could be matched in two possible situations: if a variable name occurs in definition section, the position of the variable name is where it occurs; if a variable name occurs in the body of the software 307, the position of the variable is where it is defined.

(Note: at run time a variable is corresponding to a specified section in memory that is why we give a unique position to multiple occurrence of a variable name; in contrast, a procedure will make copy of resource when it is called. Multiple call occurrence of the same procedure are corresponding to different memory sections. This is the reason why the system associates different locations with multiple call occurrence of a procedure name.)

The name recovery rules 303 are classified into direct matching, regular atomic name recovery rules, irregular atomic name recovery rules, regular compound name recovery rule and irregular compound name recovery rule. Direct matching means a name can completely be matched with a concept and therefore no other rules are needed. The other rules deal with partial matches between names in the data dictionary and the software 307.

The recovery of relationships is carried out after the recovery of names. In the procedure of relationship recovery the relationship matching rules are used to identify program constructs such as a sequences of procedure calls, a single procedure call, construct definition, etc. If the recovered names 311 above occur in certain program construct, the relationship 311 among these names implied by the program construct is thus recovered and recorded in accordance with the rules. The name/relationship matching rules will be described in further detail below.

The recovered names and relationships 311 are the data which is used at later stages. Since a trace is maintained between a name in the code and the matched concept, the software 307 is no longer be required for the subsequent stages.

The embodiment will now be described further using an example of some software written in the language C and set out in the table 3 below. This software implements the a Unix function called a connection-mode server. The code will be used to illustrate the structure of relevant knowledge base, how the names and relationship are recovered, how a working knowledge base 313 is generated and how belief of domain concepts and authenticity of knowledge slices are initialised, revised and propagated.

TABLE 3

```
#include <tiuser.h>
#include <stropt.h>
#include <fcnt1.h>
#include <stdio.h>
#define DISCONNECT −1
#define SRV_ADDR        1 /* server's well known address */
int conn_fd;              /* connection established here */
extern int t_errno;
main( )
{
    int listen_fd;      /* listening transport endpoint */
    struct t_bind *host;
    struct t_call *call;
    if ((listen_fd = t_open ( ` `/dev/tivc", O_RDWR, NULL))
            <0) {
        t_error( ` `t_open failed for listen_fd)");
        exit(1);
    }
/*
* By assuming that the address is an integer value,
* this program may not run over another protocol
*/
    if ((bind = (struct t_bind *)t_alloc(listen_fd, T_BIND,
            T_ALL)) == NULL) {
        t_error( ` `t_alloc of t_bind structure failed");
        exit(2);
    }
    host->qlen = 1;
    host->addr.len = sizeof(int);
    *(int *)host->addr.buf = SRV_ADDR;
    if (t_bind(listen_fd, host, host) < 0) {
        t_error( ` `t_bind failed for listen_fd");
        exit(3);
    }
/*
* Was the correct address bound?
*/
    if (*(int *)host->addr.buf != SRV_ADDR) {
        fprintf(stderr, ` `t_bind bound wrong address");
        exit(4);
    }
    if ((call = (struct t_call *)t_alloc (listen_fd, T_CALL,
            T_ALL)) == NULL) {
        t_error ( ` `t_alloc of t_call structure failed");
        exit(5);
    }
    while (1) {
        if (t_listen(listen_fd, call) < 0) {
            t_error ( ` `t_listen failed for listen fd");
            exit(6);
        }
        if ((conn_fd = accept_call(listen_fd, call)) !=
                DISCONNECT)
            run_server (listen_fd);
    }
}
```

The name recovery rules are set out in table 4 below:

TABLE 4

Regular Atomic Name Recovery Rule

| Rule No | Rule meaning | strength |
| --- | --- | --- |
| Rule 1: | first 4 characters as abbreviation | 0.4 |
| Rule 2: | remove ?_ as header | 0.7 |
| Rule 3: | first 3 characters as abbreviation | 0.6 |
| Rule 4 | first 5 characters as abbreviation | 0.7 |

Irregular Atomic Name Recovery Rule

| Concept | irregular case | belief |
| --- | --- | --- |
| handle | fd | 0.4 |

TABLE 4-continued

Regular compound Name Recovery Rule

Rule 1:    IF a compound name is N1_Nr
THEN
By applying Atomic Name Recovery Rules to N1 and N2, we get N1', N2' as recovered names; bel1, bel2 as associated beliefs of N1' and N2'. The recovered name of N1_Nr is N1'-Nr'; the belief is Minimum(bel1, bel2).

Direct Matching

Rule 1:    IF a name is completely matched with a concept in data dictionary,
THEN the name is associated with the concept and the belief of the association is set to be 1.0.

Note:
1. ? stands for any single character.
2. The operating of Rule 1 in regular atomic name recovery rule is: IF a name is completely matched with the first 4 characters of a concept in data dictionary, THEN the name is associated with the concept with initial belief being 0.4.
3. The operating of irregular atomic name recovery rule is: IF a name is completely matched with a irregular case of a concept, THEN the name is associated with the concept with initial belief being the value specified.

The data dictionary 301 derived from the domain knowledge base 309 as noted above is as in table 5 below:

TABLE 5 connection, handle, listen, host, call, open, allocate, address, length, buffer, bind, listen, accept.

Scanning of the variable definition sections of the software results in table 6 below:

TABLE 6 conn_fd(O1), t_errno(O2), listen_fd(O3), host (O4), call(O5), qlen(O6), addr(O7), len(O8), buf(O9).

Scanning of the procedure call parts of the software results in table 7 below:

TABLE 7 t_open(A1), t_error(A2), t_alloc(A3), t_error(A4), exit(A5),
t_bind(A6), t_error(A7), exit(A8), fprintf(A9), exit(A10),
t_alloc(A11), t_error(A12), t_listen(A13), t_error(A14),
exit(A15), accept_call(A16), run_server(A17).

Note: Oi or Aj denote the position of the name in the source code.

The qualified names selected in previous step are then analysed using the name recovery rules to identify any corresponding entries in the data dictionary 301. Applying direct matching rule results in the contents of the following table 8:

TABLE 8 host(O1', 1.0), link(O1', O4); call(O2', 1.0), link(O2', O5); accept_call(A1', 1.0), link(A1, A16).

Note: host(O1', 1.0), link(O1', O4) means that there exist an interpretation of the name at position O4 as concept "host". The belief for this interpretation is 1.0 as defined by the rules.

Applying regular name recovery rules results in the contents of the following table 9:

TABLE 9 open(A2', 0.7), link(A2', A1); allocate(A3', 0.7), link(A3', A3);
address(O3', 0.4), link(O3', O7); length(O4', 0.6), link(O4', O8);
buffer(O5', 0.6), link(O5', O9); bind(A4', 0.7), link(A4', A6);
listen(A5', 0.7), link(A5', A13), allocate(A6', 0.7), link(A6', A11).

Applying irregular name recovery rules results in the contents of table 10 below:

TABLE 10 connection-handle(O6', 0.4), link(O6', O1);
listen-handle(O7', 0.4), link(O7', O3);

In this example, there are three kinds of program construct indicating certain relationship. Each program construct is corresponding to a group of relationship recovery rules. The rules are as set out below in table 11:

TABLE 11

Sequential procedure calls:

rule 1:
    IF there exist A1(. . .); . . . A2(. . .),
    THEN
        We have R-before(A1, A2).
Within each procedure call:

rule 1:
    IF there exist . . .=A1(. . ., O1, . . .),
    THEN
        We have R-source-of(O1, A1).
rule 2:
    IF there exist O2=A1(. . .),
    THEN
        we have R-destination-of(O2, A1).
construct pointer rule 1:
    IF there exist O1 -> O2,
    THEN
        we have R-part-of(O2, O1).

Scanning the software code and applying relationship recovery rules results in the contents of table 12 below:

TABLE 12

R-before(A1, A3), R-before(A1, A6), R-before(A1, A11), R-before(A1, A13),
R-before(A1, A16), R-before(A3, A6), R-before(A3, A11), R-before(A3, A13),
R-before(A3, A16), R-before(A6, A11), R-before(A6, A13), R-before(A6, A16),
R-before(A11, A13), R-before(A11, A16), R-before(A13, A16).
R-destination-of(O3, A1), R-source-of(O3, A6), R-source-of(O4, A6),
    R-source-of(O3, A11), R-destination-of(O5, A11), R-source-of(O3, A13),
    R-source-of(O5, A13), R-source-of(O3, A16), R-source-of(O5, A16),
R-destination-of(O1, A16).
R-part-of(O7, O4).

It should be noted that the relationships recorded above are between the names in source code. Since we have got link between a name in the code and a concept in data dictionary we can also get the relationship between concepts. For example, R-before(A1, A3)=>R-before(A2', A3'), where A2', A3' refer to the concept open and allocate respectively. In other words, the result of the name/relationship matching module's processing of the source, code 307 with respect to the data dictionary 301 is a set of recovered names and relationships along with the position of the names in the code 307 and an initial belief measure in the recovered names/relationships.

The next stage in the processing moves to the working knowledge base generation module 315 where the recovered names/relationships 311 and the concrete semantic network & abstract semantic network 309 are utilised to generate a working knowledge base. Basically, the working knowledge base 313 is repository of copies of the elements of the domain knowledge base 309 that can be matched with the recovered names and relationships 311. The working knowledge base 313 can be regarded as the result of matching between source code 307 and domain knowledge base 309. The generating of working knowledge base 313 is divided into four steps: the generation of candidate concrete semantic networks; checking the recovered relationships; generating abstract semantic network; and plugging checked concrete semantic network into the abstract semantic network.

The generating of candidate concrete semantic network is carried out using the following algorithm:

```
CSSNset <- nil
FOR every recovered name N DO
    FOR every concrete semantic network CSN DO
        IF N can be matched with a concept in CSN
        THEN
            CCSNset <- CCSNset + CSN.
        ENDIF
    ENDFOR
```

CSSNset therefore contains all the candidate concrete semantic networks. Every recovered name is scanned against every concrete knowledge base slice. If a recovered name occurs in a concrete semantic network slice, the concrete semantic network slice is then selected as a candidate concrete semantic network slice for the working knowledge base 313 (it should be noted that at this stage the concepts in candidate concrete semantic network slices have no link with recovered names, i.e., they are position-insensitive)

The next stage in the processing by the working knowledge base generation module is to check the recovered relationships against the candidate concrete semantic network slices using the following algorithm:

```
RIRset <- recovered relationships.
CSSNset' <- nil
WHILE RIRset is not empty DO
    FOR every candidate concrete semantic network CSSN DO
        FOR every relationship in CSSN DO
            IF an relationship RIR in RIRset is matched with an
                relationship RIR' in CSSN
            THEN
                Mark RIR in RIRset.
                Mark RIR' in CSSN.
            ENDIF
        ENDFOR
        IF there exists an relationship in CSSN which can be
        matched
        THEN
            CSSN' <- CSSN
            Record the linkage of matched concepts and matched
            relationships in CSSN'.
            CSSNset' <- CSSNset' + CSSN'.
        ENDIF
    ENDFOR
    Remove all marked RIR from RIRset.
ENDWHILE
```

(It should be noted that during the processing of the algorithm above a situation could arise where multiple occurrence of the same domain knowledge exist in the source code. Different copies of domain knowledge are distinguished by the positions recorded in the recovered names and relationships. The algorithm is arranged to delete all matched relationships after all the candidate concrete semantic network is checked in one round because no further information can come out from these marked relationships. The remaining relationships will be checked in subsequent rounds. The match of relationships is position sensitive, i.e., the position of a shared name must be unique. After the algorithm is finished, CSSNset' contains all candidate concrete semantic networks with links to the source code.)

In other words, every candidate concrete knowledge slice is scanned to match recovered relationships with the relationships contained in the candidate semantic network slice. If at least one recovered relationship can be matched in a given slice, a new copy of the concrete semantic network slice is generated and forms a concrete semantic network slice in the working knowledge base 313. In addition, the concepts in the concrete semantic network slice are instantiated with the unique identifiers and position data from the matched recovered names. This process is repeated until all the recovered relationships are matched. At the end of the algorithm, each recovered relationship finds is in a working concrete semantic network and each recovered name is linked with a concept in the working knowledge base 313.

The next step in the processing of the working knowledge base generation module 315 is to generate abstract semantic network and plug all the candidate concrete semantic networks into the abstract semantic network. The generating of abstract semantic network is as follows:

```
AbstractSet <- nil.
FOR each candidate concrete semantic network CCSN(i) DO
    Concepts <- all the concepts in CCSN(i).
    AbstractSet <- AbstractSet + Abs-R-i (Concepts).
ENDFOR
```

The algorithm operates by collecting all the concepts in working concrete semantic networks (concepts in working concrete SN is position-sensitive where a link is set up between a concept in working concrete SN and, through recovered names, names in the code. If a concept has multiple positions, it will be collected as multiple elements). Each working concrete semantic net is then scanned to pick out its concepts for inclusion in the working abstract semantic relationship (i.e., the detailed relationships among concepts are ignored). At the end of processing, all the concepts collected and abstract relationships generated are put together to form the working abstract semantic network for the working knowledge base 313.

As noted above, the first step is to generate a candidate semantic network using the recovered names 311. The purpose of generating candidate semantic network is to capture only relevant knowledge slices and thereby reduce the size of working knowledge base 313. The abstract semantic network 309 and the recovered names 311 are inspected and if at least one recovered name occurs in an abstract relationship, the abstract relationship is then built. The matching of name is position-insensitive. For example, suppose the name open was matched, in abstract semantic network open occurs in Abs-R1 and Abs-R2, we then select Abs-R1 and Abs-R2 as candidate semantic network. The resulting candidate semantic network our example is as follows in table 13 below:

TABLE 13

Concepts:

Open(A1″), Bind(A2″), Listen(A3″), Accept-call(A4″), Device-name (O1″),
Listen-handle(O2″), Host(O3″), Address(O4″).
Abstract Relationships Abs-R1(A1″, A2″, A3″, A4″), Abs-R2(A1″, O1″, O2″),
Abs-R3(A2″, O2,″, O3″), Abs-R4(O3″, O4″), Abs-R5(O2″, A3″),
Abs-R6(O2″, A4″).

The recovered relationships are then checked by using candidate semantic network to establish a copy of knowledge slice associated with a certain program section. The match of name is position-sensitive, i.e., shared names must have an unique position. For example: suppose, we recovered the names open(A2', 0.7), bind(A4', 0.7), listen(A5', 0.7) and relationships R-before(A2', A4'), R-before(A4', A5'). To match with the concepts Open(A1″), Bind(A2″), Listen(A3″) and relationship R-before″(A1″, A2″), R-before″(A2″, A3″) in knowledge slice 1 of the example, we need to check that the position of shared name of two relationships is unique. In this example, the shared name is bind and the position is A4'. Once all the relationships in a knowledge slice is checked, a copy of the knowledge slice will be made with all the necessary information recorded in. The final result of generated concrete semantic network is as set out below in table 14:

TABLE 14

Working concrete semantic network

Working knowledge Slice 1:

Open(A2'), Bind(A4'), Listen(A5'), Accept-call(A1'),
R-before″(A2', A4', 1), R-before″(A4', A5', 1), R-before″(A5', A1', 1),
CS(A2', 0.10), RS(A2', 0.10),
CS(A4', 0.15), RS(A4', 0.15), CS(A5', 0.5),
RS(A5', 0.15), CS(A1', 0.15), RS(A1', 0.15),
CS(R-before″(A2', A4'), 0.10), RS(R-before″(A2', A4'), 0.40),
CS(R-before″(A4', A5'), 0.15), RS(R-before″(A4', A5'), 0.40),
CS(R-before″(A5', A1'), 0.6), RS(R-before″(A5', A1'), 0.50)

TABLE 14-continued

Working concrete semantic network

Working knowledge Slice 2:

Open(A2'), Device-name(?), Listen-handle(O1'),
R-source-of'(?, A2', 0), R-destination-of'(O1', A2', 1),
CS(A2', 0.10), RS(A2', 0.10), CS(?, 0.10), RS(?, 0.10),
CS(O1', 0.10), RS(O1', 0.10),
CS(R-source-of'(?, A2'), 0.20), RS(R-source-of'(?, A2'), 0.20),
CS(R-destination-of'(O1', A2'), 0.50), RS(R-destination-of'(O1', A2'), 0.50)

Working knowledge Slice 3:

Bind(A4'), Listen-handle(O1'), Host(O1'),
R-source-of'(O1', A4', 1), R-source-of'(O1', A4', 1),
CS(A4', 0.10), RS(A4', 0.10), CS(O1', 0.10),
RS(O1', 0.10), CS(O1', 0.10), RS(O1', 0.10),
CS(R-source-of'(O1', A4'), 0.4), RS(R-source-of'(O1', A4'), 0.4),
CS(R-source-of'(O1', A4'), 0.4), RS(R-source-of'(O1', A4'), 0.4)

Working knowledge Slice 4:

Host(O1'), Address(O3'),
R-part-of'(O1', O3', 1),
CS(O1', 0.10), RS(O1', 0.1), CS(O3', 0.10), RS(O3', 0.10),
CS(R-part-of'(O1', O3'), 0.9), RS(R-part-of'(O1', O3'), 0.9)

Working knowledge Slice 5:

Listen-handle(O1'), Listen(A5'),
R-source-of'(O1', A5', 1),
CS(O1', 0.10), RS(O1', 0.10), CS(A5', 0.10), RS(A5', 0.10),
CS(R-source-of'(O1', A5'), 0.9), RS(R-source-of'(O1', A5'), 0.9)

Working knowledge Slice 6:

Listen-handle(O1'), Listen(A1'),
R-source-of'(O1', A1', 1),
CS(O1', 0.10), RS(O1', 0.10), CS(A1', 0.10), RS'(A1', 0.10),
CS(R-source-of'(O1', A1'), 0.9), CS(R-source-of'(O1', A1'), 0.9)

We can see from table 14 above that the working knowledge base 313 maintains direct link with source code. The symbol '?' indicates that no recovered name was found to match with that concept in a knowledge slice. The last numeral in the relationship notation indicates whether such a relationship was matched (1 means a match was found while 0 means no match was found. The contribution strength and refutation strength are copied into working knowledge base 313 from the domain knowledge base 309 for use in later stages described in detail below.

We then construct working abstract semantic network based on the working concrete semantic network. The result is shown as shown in table 15 below:

TABLE 15

Concepts:

Open(A2', 0.7), Bind(A4', 0.7), Listen(A5', 0.7), Accept-call(A1', 1.0),
Device-name(?), Listen-handle(O7', 0.4), Host(O1', 1.0),
Address(O3', 0.4).

Abstract Relationships

Abs-R1(A2', A4', A5', A1'), Abs-R2(A2', ?, O1'),
Abs-R3(A4', O7', O1'), Abs-R4(O1', O3'), Abs-R5(O7", A5'),
Abs-R6(O7', A1').

Authenticity of Each Knowledge Slice

AU1(0), AU2(0), AU3(0), AU4(0), AU5(0), AU6(0).

The present embodiment uses an uncertainty reasoning model that is built on the axiom system of confirmation theory. The initial belief of a concept in the working knowledge base 313 comes from the degree of matching between a concept in the data dictionary 301 and a name in the software 303 being analysed. In practice, programmers often write abbreviation of meaningful names in source code, which leaves ambiguity to these names. To deal with this reality, the two classifications are given to atomic name recovery rules, namely, regular atomic name recovery rules and irregular atomic name recovery rules. One example of regular atomic name recovery rule is: "first three letters (0.15)" which means if a name in the code is matched with the first three letters of a concept, the name can be linked with this concept with an assigned belief, 0.15. Irregular abbreviation usually comes from the pronunciation of a word which is difficult to write standard rules for it and therefore different irregular abbreviation cases are collected. For example:

| Atomic Name | irregular cases |
| --- | --- |
| Information | info (0.90), infor (0.85) |

If a name in the code is matched with one of a concept's irregular cases directly, a quantified linkage between the concept and the name can be set up.

A single compound name is composed of several atomic names with connecting symbols like '—' or '_', etc. The ambiguity of a compound name mainly comes from the ambiguity of each composite atomic name. We also give two classifications to compound name recovery rules, namely, regular compound name recovery rule and irregular compound name recovery rules. The regular compound name recovery rule will check each of its composite name by using atomic name recovery rules; the belief of the whole name is assigned to the minimum belief among all its composite atomic names. Irregular compound name abbreviations are commonly used abbreviations without standard rules. Irregular abbreviations are also collected, for example,

| Compound Name | Composite Names | Irregular Cases |
| --- | --- | --- |
| Domain-Name | Domain, Name | DN (0.7) |

The check of an irregular compound name is done by matching its irregular cases directly.

For both atomic names and compound names, we give relatively higher belief to irregular name recovery rules than to regular name recovery rules. Nevertheless, name recovery is an exhaustive process where direct matching, irregular name recovery rules and regular name recovery rules are all utilised tested. The belief in a relationship is dependent on the belief of its participating concepts. We therefore need not give initial belief to relationships.

The working knowledge base 313 contains domain knowledge which is a set of cooperative domain knowledge slices, with each knowledge slice being composed of a set of cooperative domain concepts. A domain concept can get support from other concepts in the same knowledge slice or even from other knowledge slices. The belief of a domain concept is therefore subjected to be revised once the belief of its cooperative concepts changes. This process can be referred to as belief revision.

As noted above, each concept and each relationship in every knowledge slice of the working knowledge base 313 is assigned a Contribution Strength (CS) and Refutation Strength (RS). CS indicates the strength the presentation of a domain concept or an relationship has to build up positive belief in the context of a knowledge slice. RS indicates the destructing power the absence of a domain concept or a relationship has to refute the context of a knowledge slice. Both CS and RS are real numbers belonging to [0, 1.0]. By default, CS and RS are set to 0.

Let SN={c1, . . . , cm, r1, . . . , rk} be a knowledge slice, where ci, 1<=i<=m and rj, 1<=j<=k denote concepts and relationships in the knowledge slice respectively; {(CS(i), RS(i))|1<=i<=m+k} be the contribution strength and refutation strength of each element in SN respectively; {CF(i)|1<=i<=m+k} be the current belief of each element in SN; {CF'(i)|1<=i<=m+k} be the prepared belief of each element in SN; AU be the authenticity degree of SN. The calculation of CF'(i) is: CF'(i)=CF(i), if i is a concept; CF'(i)=the production of beliefs of all participating concepts, if i is an relationship. The algorithm of calculating the authenticity (AU) is as follows:

| Algorithm for calculating Authenticity of context |
| --- |
| MB <- 0 |
| FOR i <- 1 TO m+k DO |
|    IF CF'(i) > 0 THEN |
|       MB <- MB + (1-MB)*CF'(i)*CS(i) |
| ENDFOR |
| MD <- 0 |
| FOR i <- 1 TO m+k DO |
|    IF CF'(i) < 0 THEN |
|       MD <- MD + (1-MD)*(-CF'(i))*RS(i) |
| ENDFOR |
| AU <- (1-MD)*MB-MD |

Note:
<- stands for the operation of ordinary assignment

The calculation of MB (or MD) in the algorithm above constitutes an Abel group in the field of [-1, 1]-Abel (Theorem) and a proof of this can be obtained in accordance with the definition of Abel group. The computation of AU is independent of the order of concepts and relationships. MB collects the beliefs that favour the context of a knowledge slice while MD collects the beliefs that refute it. The computation of AU through MB and MD makes it possible for MD to be greater than MB. This is a desirable property since a refutation is normally issued by users and therefore should be given higher weight. It is easy to verify that -1<=AU<=1. Initially, AU is set to be 0. The calculation of AU is done in concrete semantic network in the working knowledge base 313.

The authenticity of a knowledge slice is calculated by synthesising the "votes" from all its participating concepts and relationships. The concepts in the knowledge slice can therefore be re-evaluated once the authenticity of the knowledge slice is changed. The formulas for calculating the effect the revised authenticity of a knowledge slice has on its participating concepts are set out below. The belief of relationships are not revised. Let δ(AU)=AU-AU', where AU' is the previous authenticity of a knowledge slice and D(CF_{i}) be the ratio of belief-revising for concept i in the knowledge slice. The other notations used in these formulas are the same as the definition above for calculating the authenticity of a knowledge slice.

We have:

$$D(CF\{i\}) = \begin{cases} \{\delta(AU) \times CS(i) \text{ if } \delta(AU) > 0 \\ \{\delta(AU) \times RS(i) \text{ else} \end{cases}$$

When authenticity of a context is positive, the positive belief of a concept in the context is increased in proportion to the contribution strength; otherwise, the negative belief of a concept increases the refutation strength. D(CF{i}) is also calculated from the elements in the concrete semantic network and the result is represented in the abstract semantic network.

A domain concept can have different roles in different contexts or knowledge slices therefore, since the beliefs of concepts are revised in different contexts, a final synthesis of the beliefs of each concept in each of its contexts is then carried out. Let D(CF'(i, j)) be the ratio of belief revision for concept i in context j, 1<=j<=m. Let CF'(i) be the old belief of concept i, and CF(i) be the synthesised belief for concept i. The algorithm for calculating CF(i) is as follows:

| Algorithm for Synthesising Multiple Beliefs |
| --- |
| MB <- 0 |
| FOR j <- 1 TO m DO |
|    IF D(CF'(i, j)) > 0 THEN |
|       MB <- MB + (1-MB)*D(CF'(i, j)) |
| ENDFOR |
| MD <- 0 |
| FOR j <- 1 TO m DO |
|    IF D(CF'(i, j)) < 0 THEN |
|       MD <- MD + (1-MD)*(-D(CF'(i, j))) |
| ENDFOR |
| D(CF'(i)) <- MB - MD |
| CF(i) <- CF'(i) + (1-CF'(i))*D(CF'(i)) |

Note:
<- stands for the operation of ordinary assignment

Again, the calculation of MB (or MD) constitutes an Abel group in the field of [-1, 1] and the computation of CF(i) is independent of the order of D(CF'(i, j)). In the above algorithm, we first synthesise the ratios of belief revision of a concept in different knowledge slices prior to updating the old belief of the concept by the synthesised ratio. The calculation of CF(i) is using the contents of the abstract semantic network.

The revised belief of a concept can again revise the authenticity of the knowledge slices it occurs and in turn, affects the beliefs of the concepts contained in these knowledge slices, and so on. A propagation of the effect of revised belief of a concept will occur in the semantic network. In the present embodiment two different kinds of belief propagation, namely, dual-way belief propagation and singular-way belief propagation under the control of the dual-way belief propagation and singular-way belief propagation modules 317 and 319 respectively.

Dual-way belief propagation is carried out immediately after the beliefs of domain concepts are initialised. Suppose, we regard a domain knowledge slice as a domain expert, the belief of a domain concept as the viewpoint of a domain expert on the concept. At the stage when the beliefs of domain concepts are just initialised, the viewpoints of domain experts have not yet been imposed on these concepts. A substantial exchange of viewpoints among domain experts on concepts is therefore useful. The viewpoints are exchanged through the belief revision of concepts. The term "dual-way" is used because the exchange of view points is in two directions i.e. a domain expert can both influence other domain experts and vice verse.

Dual-way belief propagation is an iterative process. After one pass, only closely linked domain experts can exchange viewpoints. As the process goes on, more alienated domain experts can exchange their viewpoints. In the present embodiment a constraint β is set to limit the number of iterative rounds so that closely related domain experts do not over influence each other and alienated experts have less influence on each other.

Each concept and relationship has a contribution strength and refutation strength. This kind of pre-defined knowledge is originally kept in domain knowledge base and put into concrete semantic network in working knowledge base when it is generated. In addition, the mark which indicates whether an relationship exist is also kept in the concrete semantic network. CF(i) which occurs above comes from the belief of recovered names. D(CF{i}) in above is kept in abstract semantic network. CF'{i} and CF{i} above refer to the old and new belief of recovered name.

As noted above in the example, the belief for each name is assigned during the name recovery process and constitutes the initial belief of a concept. The authenticity of each knowledge slice has not been evaluated and is set to zero by default. Since most names have not been completely matched with concepts the next stage in the processing is to compute the authenticity of a knowledge slice based on the contribution and refutation of its participating concepts and relationship, then to revise the belief of a concept. The belief revision module 317 is arranged to take each knowledge slice and apply the above formulae for belief revision. Taking knowledge slice one first this has the results set out below in table 16:

TABLE 16

Working knowledge Slice 1:

Open(A2'), Bind(A4'), Listen(A5'), Accept-call(A1'),
R-before"(A2', A4', 1), R-before"(A4', A5', 1), R-before"(A5', A1', 1),
CS(A2', 0.10), RS(A2', 0.10),
CS(A4', 0.15), RS(A4', 0.15), CS(A5', 0.5),
RS(A5', 0.15), CS(A1', 0.15), RS(A1', 0.15),
CS(R-before"(A2', A4'), 0.10), RS(R-before"(A2', A4'), 0.40),
CS(R-before"(A4', A5'), 0.15), RS(R-before"(A4', A5'), 0.40),
CS(R-before"(A5', A1'), 0.6), RS(R-before"(A5', A1'), 0.50)
Working abstract semantic network:
Concepts Open(A2', 0.7), Bind(A4', 0.7), Listen (A5', 0.7), Accept-call(A1', 1.0),
Abstract Relationships Abs-R1(A2', A4', A5', A1').
Convert into the notation in formulas CF(open)=0.7 CF(bind)=0.7 CF(listen)=0.7 CF(accept-call)=1.0
CF'(open)=0.7 CF'(bind)=0.7 CF'(listen)=0.7 CF'(accept-call)=1.0
CF'(R-before(open, bind))=0.7*0.7=0.49
CF'(R-before(bind, listen))=0.7*0.7=0.49
CF'(R-before(listen, accept-call))=0.7*1.0=0.7
CS(open)=0.10 CS(bind)=0.15 CS(listen)=0.5 CS(accept-call)=0.15
CS(R-before(open, bind))=0.10
CS(R-before(bind, listen))=0.15
CS(R-before(listen, accept-call))=0.6
RS(open)=0.10 RS(bind)=0.15 RS(listen)=0.15 RS(accept-call)=0.15
RS(R-before(open, bind))=0.40
RS(R-before(bind, listen))=0.40
RS(R-before(listen, accept-call))=0.5
Intermediate Result Current authenticity of knowledge slice 1: AU(slice1)=0.77
Previous authenticity of knowledge slice 1: AU'(slice1)=0
Ratio of revised belief for each concept Dcf(concept):
Dcf(open)=0.07 Dcf(bind)=0.12 Dcf(listen)=0.39 Dcf(accept)=0.12
Synthesised ratio of revised belief for each concept TABLE 16-continued Dscf(concept):
Dscf(open)=0.07 Dscf(bind)=0.12 Dscf(listen)=0.39
Dscf(accept)=0.12
(note: since we evaluate only one knowledge slice, no belief of concept
from other knowledge slices is available to be synthesised)
Revised belief of each concept CF_new(concept):
CF-new(open)=0.72 CF_new(bind)=0.74 CF_new(listen)=0.82
CF_new(accept-call)=1.0

From the above example, we can see the belief of each concept is improved as a result of the positive support from the other concepts. In the situation where individual knowledge slices are linked through shared concept, the co-operation can also comes from different knowledge slices.

Once each of the knowledge slices has undergone the process described above for knowledge slice one, the next step in the dual-way belief revision processing is to synthesise the belief in the concepts between the slices. The constraint β{r} which limits the number of iterative rounds is set to be 2. The data table 17 shows the data obtained in the experiment. In table 17 CFi, i=0 . . . β{r} denotes the belief of domain concepts at initial round, first round and second round of the dual-way belief propagation process respectively, D(CFi), i=1 . . . β{r} denotes the synthesised ratio for revising the belief of a concept at round I and AUi, i=0 . . . β{r} denotes the authenticity of knowledge slices at round i. The results of this process are set out below in table 17.

TABLE 17

| Concepts | initial round CF0 | 1st round D(CF1) | 1st round CF1 | 2nd round D(CF2) | 2nd round CF2 |
|---|---|---|---|---|---|
| Open | 0.7 | 0.1 | 0.73 | 0.02 | 0.74 |
| Bind | 0.7 | 0.76 | 0.93 | 0.02 | 0.93 |
| Listen | 0.7 | 0.41 | 0.82 | 0.06 | 0.83 |
| Accept | 1.0 | 0.20 | 1.0 | 0.03 | 1.0 |
| Device-name | 0 | 0.03 | 0.03 | 0.03 | 0.06 |
| Listen-handle | 0.5 | 0.80 | 0.90 | 0.04 | 0.90 |
| Host | 1.0 | 0.43 | 1.0 | 0.06 | 1.0 |
| Address | 0.4 | 0.43 | 0.66 | 0.04 | 0.67 |

| Knowledge Slices | Au0 | Au1 | Au2 |
|---|---|---|---|
| Slice1 | 0 | 0.77 | 0.82 |
| Slice2 | 0 | 0.26 | 0.43 |
| Slice3 | 0 | 0.50 | 0.71 |
| Slice4 | 0 | 0.45 | 0.89 |
| Slice5 | 0 | 0.40 | 0.71 |
| Slice6 | 0 | 0.53 | 0.85 |

From table 17 it can be seen that the belief of concepts and the authenticity of knowledge slices improve as the dual-way belief propagation process iterates. At the initial round where concepts are isolated from each other, the authenticity of knowledge slices cannot be decided and therefore be assigned to be 0. After round 1, the viewpoints on the authenticity of knowledge slices are formed and the isolated concepts "shake hands" for the first time. The values of D(CF1) at this round are significantly high, which contributes most to the reduction of ambiguity of concepts in the knowledge slices. After round 2, neighbouring knowledge slices begin to exchange their viewpoints on domain concepts and continue to make contribution to the reduce the ambiguity of concepts in the knowledge slices. However, compared to D(CF1), the values of D(CF2) are much lower because "closely related" knowledge slices have already exchanged their main viewpoints on concepts and the alienated knowledge slices have less influence on revising the beliefs of each other. It can be proved that a convergence for the beliefs of concepts or authenticities of knowledge slices be reached as belief propagation process goes on.

The behaviour of some individual concepts in this belief propagation process is also noted with reference to table 17. In particular, having a certainty factor of 1.0, the concept Host has a large effect on the increment of the belief of the concept Bind and of the concept Address which are its neighbouring concepts. Getting support from four knowledge slices, the concept Listen-handle makes the most significant increment of its belief among all other concepts. The beliefs of concept Accept and the concept Host did not increase because a upper bound of belief, 1.0, has been reached. The concept Device-name, the belief in which is zero at initial belief propagation round, is assigned a positive belief at the end of belief propagation process resulting from the support of its co-operative concepts. A careful check for this concept in the code may therefore necessary to recover what previously failed to be recovered.

The benefit from taking the advantage of co-operative domain knowledge in domain knowledge recovery process is best shown by AU1 and AU2. The upper bound threshold $\beta\{s+\}$ for accepting knowledge slices is set to be 0.7. After round 1 only the authenticity of knowledge slice 1 is higher than $\beta\{s+\}$ and is accepted. At the end of round 2 however, Knowledge slice 3, 4, 5, 6 are further accepted and associated with the code where linkages between concepts in the semantic network and names in the code are also maintained. In this way, more domain knowledge embedded in the code which previously failed to be recovered comes to light.

In summary, both two-way and one-way (explained in further detail below) belief propagation are "atomic" processes, i.e., each has to be completely finished before other processes start. Two-way belief revision is made up of three steps—calculating the authenticity of each slice; revising the belief of each concept within each slice; and synthesising the beliefs in the concepts between the slices. Furthermore, a concept can occur in multiple knowledge slices (contexts). The belief of the concept is revised in each knowledge slice first. After which all the revised beliefs of the concept are synthesised to get a single value.

One-way Belief Propagation is invoked when a user intervenes in the reasoning process by manually specifying the belief of a concept. It is assumed that a user is the domain expert with highest authority. It is not allowed for other domain experts (knowledge slices) to revise a user's and their successors' (those knowledge slices chosen for belief revision after user's intervention) belief. The belief propagation is therefore a one-way process. In the same way as for two way belief propagation, a constraint DC is set to limit the number of propagation layers. Table 18 below gives the algorithm used by the one-way belief propagation module 319 for controlling the singular-way belief propagation.

TABLE 18

STACK <= (knowledge slices affected by the concept
    revised by a user, 1).
WHILE not-empty(STACK) DO
    (CKS, layer) <= STACK.
    IF (not-marked(CKS)) AND (layer <= DC) THEN
        1. Compute the authenticity of CKS.
        2. Revise the beliefs of all the concepts in CKS.
        3. Synthesise the multiple beliefs of a concept
          if needed.

TABLE 18-continued

4. Marks CKS as 'processed'.
        5. CKS' <- knowledge slices affected by the
          concepts in CKS.
        6. STACK <= (CKS', layer+1)
    END IF
ENDWHILE Note:
<= stands for the operation of POP or PUSH on a STACK.
<- stands for the operation of general assignment.

Single-way belief propagation is a multi-round process. Suppose, there are N knowledge slices "surrounding" the concept which triggers single-way belief propagation. To fulfill the propagation N rounds are needed and in each round only one knowledge slice is selected for re-evaluation of the belief of its concepts. Since only one knowledge slice is re-evaluated at a time no belief synthesis step is necessary.

One-way belief propagation is treated as multi-round rather than iterative because after one knowledge slices is re-evaluated, it is not processed again. This means that the revised belief of concepts that occurred for that slice will have no feedback element to it. One-way belief propagation is different from two-way belief propagation in that each domain expert has no equal authority. The opinion of a higher authority domain expert is "imposed" on other domain experts with lower authority.

The typical scenario of one-way belief propagation is a user (with highest authority) assigns a belief to a concept and triggers the one-way belief propagation, the changed belief of the concept will affect the authenticity of the knowledge slices in which it occurs and the belief of the concepts contained in these knowledge slices will be revised due to the change of authenticity of the knowledge slices. Since the originally modified belief is from a reliable source, i.e., the user, the changed belief of these concepts will be confirmed and these concepts quit belief propagation process and the belief propagation process is carried on by other concepts whose belief is yet to be revised. In one-way belief propagation process, the belief of each concept is revised only once whereas in two-way belief propagation process, the belief of each concept is revised N times, where N is number of rounds. The two processes are independent from each other.

A large software program is generally co-written by a group of programmers with each programmer being responsible for part of the whole program. Each part of the program is usually a self-contained component with relatively independent functionality. Empirical studies suggest that each programmer, having different training background and temperament, tends to consistently use a particular code-writing style. Therefore, if different programming styles in a program can be identified then this information can be used to partition the program into smaller self-contained sub-modules. The benefits of this method in the present context is that the search for good paths at singular-way belief propagation stage can be concentrated in a single self-contained module where strongly-coupled domain knowledge exists. Also the program regions with good readability can be searched first.

In the present embodiment, three groups of features in source code are used to distinguish different programming styles. These are style of comments, style of names and style of indent. A taxonomy has been given to each group of features which will be described in further detail below. The program initially goes through a partitioning process which has three stages, namely, programming style, sampling, program cutting and program re-healing. An algorithm for creating sampling function for programming styles is given in table 19 below. Some abbreviations are Programming Styles (PS), Current Program Line (CPL), Sampling Function (SF), Sample Interval (SI).

TABLE 19

Algorithm for Creating Sampling Function
of Programming Styles for A Program

```
PS  <- null
CPL <- 1
SF  <- null
WHILE CPL < > END-OF-PROGRAM DO
    ps <- programming style in CPL
    IF ps in PS THEN
        PS[ps] <- PS[ps] + 1
    ELSE
        PS <= ps
        PS[ps] <- 1
    ENDIF
    IF (CPL mod SI) == 0 THEN
        SF <= PS
        PS <- null
    ENDIF
    CPL <- CPL + 1
ENDWHILE
```

Note:
<- stands for the operation of general assignment
<= stands for the operation of adding a element to a set The algorithm above starts from the beginning of the source code and at each line of code a check is made for all the patterns of programming styles. If a new pattern is matched, this is logged by adding the corresponding programming style to the sampling function of this procedure and adding 1 to the number of occurrence of this programming style. If a pattern that has existed in the sampling function is matched, the number of occurrence of that programming style in the log is increased by 1. When the end of the code is reached the sampling function for each procedure is contained in the log.

A programmer can occasionally use other programming styles. By setting a threshold to the sample function, such noise can be filtered out and main features of programming style for a programmer remain. Some programming styles can also commonly be shared by different programmers. The correct cutting points of a program is where new programming styles come up or old programming styles disappear. Table 20 below provides an algorithm for program cutting. Some abbreviations are Sample Pointer (Sp), Sample Number (SN), Programming Style Numbers (PSN), Partition (Par), programming style pointer (ps).

TABLE 20

Algorithm for Program Cutting

```
Sp <- 1
Par <- null
WHILE Sp < > SN DO
    ps <- 1
    WHILE ps < > PSN DO
        IF (PS[ps] [Sp]=0 AND PS[ps] [Sp+1]>0) OR
           (PS[ps] [Sp]>0 AND PS[ps] [Sp+1]==0) THEN
            Par <= Sp
        END IF
        ps <- ps + 1
    ENDWHILE
    Sp <- Sp + 1
ENDWHILE
```

Note:
<- stands for the operation of general assignment
<= stands for the operation of adding an element into a set.

The cutting of a program is done in sequential program space, whilst a self-contained module can spread across separated program regions which needs to be re-healed again. The cutting algorithm uses the sampling functions produced by the sampling algorithm above and compares each one against every pair of neighbouring procedures. If either programming style is different between the two procedures, a cutting point is set between the two procedures. At the end of the sampling function, the source code is sequentially cut into groups in accordance with the cutting points. The principle employed by the algorithm is that each programmer consistently adheres to a major programming style. If styles change between procedures it is concluded that the two procedures are written by two programmers and therefore a cutting point can be set. The final stage is the healing which is done by matching exactly the same programming styles among different program regions.

As noted above, if we can identify different programming styles in a program, we will find out different programmers who wrote the program and in turn, partition the program into smaller self-contained sub-modules. Each sub-module contains a relatively independent domain knowledge. The benefits of this method in the context of DKB are that rather than having to analyse a program as a whole piece, the analysis of a program can be concentrated in individual sub-module. Analysing smaller sub-module can significantly reduce the search space in program and therefore minimise the computational complexity of name recovery, relationship recovery, generating working knowledge base, belief revision and belief propagation.

Suppose we have the following source code sections:

Section 1:

```
int main(argc, argv)
    int  argc;
    char *argv[ ];
{
    ...
    static XmaGlobalData xmaData;
    Widget mainWid, topLevel, bar, topPane, pane1, pane2, form;
    ...
    /* Initialise X toolkit */
    topLevel=XtInitialize(``xma'',``Xma'', options,
XtNumber(options), &argc, argv);
    ...
}
```
Section 2:

```
void Connection-Mode( )
{
    ...
/*
 * Was the correct address bound?
 */
        if (*(int *)host->addr.buf != SRV_ADDR) {
            fprintf(stderr, ``t_bind bound wrong address'');
            exit(4);
        }
    ...
}
```
Section 3:

```
/* Popup Second Abstract Action Dialog */
void PopupSecAbstrActionDialog(w, closure, call_data, mesg)
    Widget w;
    caddr_t closure;
    caddr_t callData;
    char *mesg;
{
    Widget label, text, ok;
    Arg args[5];
```

-continued

```
    PositionSecAbstrActionDialog( );
    XtSetArg(args[0], XmNdialogTitle, XmStringCreate(XtName(w),
XmSTRING_DEFAULT_CHARSET));
    XtSetArg(args[1], XmNmessageString, XmStringCreate(mesg,
XmSTRING_DEFAULT_CHARSET));
    XtSetValues(secabsactiondialog, args, 2);
    XtManageChild(secabsactiondialog);
}
. . .
```

Three groups of key features in source code can be used to distinguish different programming styles as above are style of comments, style of naming and style of indent. The taxonomy to each group of features are set out in table 21 below:

TABLE 21

| Style of Comments Code | patterns |
|---|---|
| Style 1:<br>  /* x */<br>SC1 | /* X */ |
| Style 2:<br>  /*<br>SC2<br>  *x<br>  . . .<br>  */ | /*\n{ *X\n} */ |
| Style 3: /*<br>SC3<br>  x<br>  . . .<br>  */ | /*\n{X\n}*/ |
| Note:<br>1. \n stands for RETURN.<br>2. X stands for an arbitrary sequent of characters without '\n', '*' being contained.<br>3. {X} stands that X can occur one or more times repeatedly.<br>4. The pattern is used to match corresponding styles in source code.<br>5. Style 2 reflects a rigid personality, whereas Style 3 indicate a freedom tendency.<br>The person using Style 1 could never waste a penny. | |
| Style of Naming code | patterns |
| Style 1:<br>  Connection-Mode<br>SN1 | W{-W} |
| Style 2:<br>  Connection_Mode<br>SN2 | W{_W} |
| Style 3:<br>  ConnectionMode<br>SN3 | W{W} |
| Note:<br>1. W stands for a atomic name. The identification of the start of an atomic name is following the patterns: `` ?X", `` XCX" where '?' stands for any character, X stands for an arbitrary sequent of characters, C stands for a capitalised character. '?' and 'C' are therefore indicating the start of an atomic name. The identification of the end of an atomic name is following the patterns: `` X? ``, `` X?CX" where the meaning of notation 'X', '?' and 'C' remains the same. '?' is therefore indicating the end of an atomic name.<br>2. {W} stands for the once or more than once occurrence of W.<br>3. The person like Style 1 treasures cooperation more than the person using Style 2, whereas the person using Style 2 will generally think individual role is more important. The person who use Style 3 must have a good eyesight than others. | |

TABLE 21-continued

| Style of indent | Pattern | Code |
|---|---|---|
| Sytle 1:<br>  bbx | bbx | SI1 |
| Style 2:<br>  bbbbbbx | bbbbbbx | SI2 |
| Note:<br>1. b stands for a blank space. x stands for an arbitrary sequent of characters.<br>2. The person like Style 2 could be more romantic than the person using Style 2. | | |

Applying the sampling algorithm above to the source code example results in the sampling function set outin table 22 below;

TABLE 22

| | Sample Function (SF) | | |
|---|---|---|---|
| | Comments | Naming | Indent |
| Section 1: | (SC1, 1) | (SN3, 8) | (SI1, 6) |
| Section 2: | (SC2, 1) | (SN1, 1) | (SI2, 2) |
| Section 3: | (SC1, 1) | (SN3, 10) (SN2, 3) | (SI1, 11) |

The threshold of the sample function which filters out noise to leave the main features of programming style for a programmer remain results in only the style which occurs most frequently being preserved. The filtered sample function of table 22 is set out in table 23 below:

TABLE 23

| | Filtered Sample Function (SF) | | |
|---|---|---|---|
| | Comments | Naming | Indent |
| Section 1: | (SC1, 1) | (SN3, 8) | (SI1, 6) |
| Section 2: | (SC2, 1) | (SN1, 1) | (SI2, 2) |
| Section 3: | (SC1, 1) | (SN3, 10) | (SI1, 11) |

The result of program cutting after applying the algorithm above is set out in table 24 below:

TABLE 24

{Section 1} {Section 2} {Section 3}. . .

Because Section 1 and Section 3 have the same programing style (comment, naming and indent), we assume that both of the sections are written by one programmer. We merge Section 1 and Section 3 into one module and put Section 2 into another module. The result of program partitioning is finally as set out below in table 25:

TABLE 25

Partition 1: {Section 1, Section, . . . }
Partition 2: {Section 2, . . .}
. . .

The result is coherent to programmers' intuition, i.e., Section 1 and Section 3 implements the user interface function, whereas Section 2 implements telecommunication network function. The benefit of domain-oriented program partitioning is that program analysis (either by human or automated tools) can be concentrated on each self-contained program partition. In the context of domain knowledge recovery from source code, we can restrict the belief propagation within the boundary of each program partition.

Suppose there are N knowledge slices surrounding the concept C to which a belief is input by a user, the singular-way belief propagation is then triggered and needs N rounds of belief revision. The first knowledge slice to which belief is revised is selected from the knowledge slices which contains the concept C. The subsequent knowledge slice to be revised is selected from the "neighbouring" knowledge slices to the revised slice. If in an initial state no knowledge slices have been revised, while at final state, all of the N knowledge slices are revised then from initial state to final state there must exist a permutation of N knowledge slices where each knowledge slice is revised in turn. Since at end of each round there could be multiple choices of which knowledge slice to be revised in next round there could exist multiple permutation of N knowledge slices which can link between initial state and final state. From the formulas for computing authenticity of a knowledge slice and revising the belief of a concept it can be seen that different permutation of N knowledge slices can result in different final revised belief an therefore a good permutation needs to be chosen in order to obtain a better result. Basically, a good permutation is one which evaluates a knowledge slice which is in a meaningful or name rich area first. The knowledge slice residing in less clear or name rich program section being revised later. The heuristic rule is used to decide which program section is rich in meaningful names which is describe in further detail below.

We first address the issue of evaluating the quality of a program section. Let $Qua\{i\}$ be the quality of a program section i, CW and NW be the weights for comment and name respectively where CW>0, NW>0, CW+NW=1, $CD\{i\}$ and $ND\{i\}$ be the density of comments and names in program section i respectively. Both $CD\{i\}$ and $ND\{i\}$ can be calculated based on the algorithm described in table 19 above. We have:

$$Qua\{i\}=CW \times CD\{i\}+NW \times ND\{i\}$$

The key point for selecting a good search path at singular-way belief propagation stage is to select a good knowledge slice. Let KS be a knowledge slice, PSS be the set of program sections corresponding to the participating domain concepts of this knowledge slice, QPSS be the qualities of these program sections, QKS be the quality of KS. We have QKS=min{QPSS}. The priorities for choosing good knowledge slices are, in turn, given to: (1) knowledge slices with high QKS; (2) knowledge slices in the same program partition of the currently selected knowledge slice.

Singular-way belief propagation is triggered when a user manually assigns a belief to a recovered name. In most cases, the user associates a name in the source code with a concept in knowledge base where the belief of the association is given 1.0. In this way, user's intervention is allowed by the system.

It should be noted that in a singular-way belief propagation process, only the authenticity of those knowledge slices whose distance from the concept $C\{u\}$ evaluated by a user is less than or equal to DC is re-evaluated. In addition, the authenticity of those knowledge slices mentioned above is re-evaluated only once. If the initial state $S\{l\}$ is the state when no knowledge slice is re-evaluated and the final state $S\{f\}$ is when all of those knowledge slices are re-evaluated then the one-way belief propagation can be described as follows: Starting from initial state $S\{l\}$, iteratively choose a knowledge slice to re-evaluate until final state $S\{f\}$ is reached. The first knowledge slice to be re-evaluated is selected from those knowledge slices which contain concept $C\{u\}$. The subsequent knowledge slices to be re-evaluated are chosen from those knowledge slices which are the neighbouring knowledge slices to the knowledge slices already evaluated. Neighbouring means those slices which have most concepts in common.

As a result, many alternative paths exist from initial state $S\{l\}$ to final state $S\{f\}$ and the different re-evaluation paths can lead to different results. For example, if the process started from a program section which contains names with very high degree of ambiguity, it could end up discarding these names once the one-way belief propagation process is finished. However, if the process started from a program section which contains names with lower degree of ambiguity, good results can be obtained at earlier stages of the one-way belief propagation process. Also, the good result obtained can throw light on program sections with high degree of ambiguity through links among these program sections, which can result in the recovery of knowledge slices in highly ambiguous program sections which could otherwise be disregarded.

In order to evaluate the degree of ambiguity in each program sections, a heuristic rule is used. The basic principle of the rule is: a responsible programmer usually writes considerable program comments and meaningful names which makes his/her code easier for others to read. It is more likely to recover more domain knowledge from such kind of code. Therefore a program quality metric is provided to help make judgement of which program section is good and should be chosen to be re-evaluated first. The metric is based on the density of comments and meaningful names a program section has. Given the following code:

Section 1

```
static Cursor cursor=(Cursor)NULL;        /* hour glass cursor */
static Window window;    /* top pane window */
static Display *display;         /* the display */
/*
* Create hour glass cursor.
*/
void CreateWaitCursor(widget)
Widget widget;
{
    Pixmap hg, hg_msk;
    XColor white, black;
    Colormap cmap;
    int screen, depth;
    display = XtDisplay(widget);
    screen = DefaultScreen(display);
    depth = DefaultDepth(display, screen);
    window = XtWindow(widget);
    white.pixel = WhitePixel(display, screen);
    black.pixel = BlackPixel(display, screen);
    cmap = DefaultColormap(display, screen);
    cursor = XCreateFontCursor(display, XC_watch);
}
/*
* Set cursor for window to hour glass.
*/
void SetWaitCursor( )
{
    if (cursor)
        XDefineCursor(display, window, cursor);
}
/*
* Restore default cursor for window.
*/
void UnsetWaitCursor( )
{
    XUndefineCursor(display, window);
}
```

-continued

```
Section 2 include "item.h"
/*
 * Return the generic type field (a string).
 */
char *GetGenericType (pd)
    PosnDataPtr pd;
{
    return (pd->g_type);
}
/*
 * Return the specific type field (a string).
 */
char *GetSpecificType(pd)
    PosnDataPtr pd;
{
    return (pd->s_type);
}
/*
 * Return the position field (a string).
 */
char *GetPosition(pd)
    PosnDataPtr pd;
{
    return (pd->posn);
}
/*
 * Return the generic type field (a string).
 */
int GetSpan(pd)
    PosnDataPtr pd;
{
    return (pd->span);
}
```

The raw data of each section is collected as follows:

For Section 1:

Number of comments: 6
Number of occurrence of meaningful names: 49
Total number of program lines: 31
For Section 2:

Lines of comments: 4
Number of occurrence of meaningful names: 4
Total number of program lines: 18
The weights 0.2, 0.8 are assigned to CW and NW respectively.
The computation of Qua1 and Qua2 is list as follows:

| CD1=6/31 | ND1=49/31 | Qua1=CW*CD1+NW*ND1=1.33 |
| CD2=4/18 | ND2=4/18 | Qua2=CW*CD2+NW*ND2=0.22 |

Therefore according to the metric the clarity (quality) of Section 1 is better than that of Section 2. Given the choice between Section 1 and Section 2 as next belief revision target during singular-way belief propagation stage, Section 1 is chosen since it has the potential of recovering more domain knowledge than Section 2. Different belief propagation paths can lead to different result, the recovery of higher quality information first can also help recover lower quality information, not the vice verse.

As will be understood by those skilled in the art, any or all of the software used to implement the invention can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A computer implemented method comprising:
    (i) representing knowledge in a knowledge base, the knowledge being represented by a set of two or more concepts and of one or more relationships of a first type between two or more of said concepts, said representing knowledge comprising:
        a) dividing the set of concepts into a plurality of sub-sets, each sub-set comprising a set of concepts related to a sub-set of the knowledge;
        b) dividing the relationships among the sub-sets of concepts; and
        c) providing a further set comprising all the concepts along with a relationship of a second type that provides an association between each concept in the further set of concepts and one or more of the sub-sets of concepts and relationships; and
    (ii) inspecting the knowledge base and extracting knowledge from the knowledge base.

2. A computer implemented method according to claim 1 in which the or each concept is represented by a label for identifying the concept in domain knowledge and is associated with a unique identifier for enabling the association of the concept with one or more other concepts and/or relationships.

3. A computer implemented method according to claim 1 in which the or each relationship is represented by a label and is associated with a plurality of unique identifiers for indicating one or more other concepts and/or other relationships to which the relationship applies.

4. A computer implemented method according to claim 1 in which the or each relationship represents a relation between one or more concepts and/or relationships and one or more other concepts and/or relationships.

5. A computer implemented method according to claim 1 in which the or each concept and relationship is associated with a variable for representing the confirmation strength of the concept or relationship.

6. A computer implemented method according to claim 1 in which the or each concept and relationship is associated with a variable for representing the refutation strength of the concept or relationship.

7. A computer implemented method of extracting knowledge from software code or other structured data comprising the steps of:
    inspecting a first knowledge base having knowledge being represented by a set of two or more concepts and of one or more relationships of a first type between two or more of said concepts, the first knowledge base being produced by:
    a) dividing the set of concepts into a plurality of sub-sets, each sub-set comprising a set of concepts related to a sub-set of the knowledge;
    b) dividing the relationships among the sub-sets of concepts; and
    c) providing a further set comprising all the concepts along with a second type of relationship that provides an association between each concept in the further set of concepts and one or mare of the sub-sets of concepts and relationships;

building a list of all the labels for the concepts and relationships that are present in the first knowledge base;

taking each label for a concept from the list in turn and matching the label in accordance with a set of rules against elements of the software code or other structured data;

for each match found, entering a copy of the concept into a second knowledge base having the same basic structure as the first knowledge base;

taking each label for a relationship from the list in turn and matching the label in accordance with a set of rules against elements of the software code or other structured data; and for each match found, entering a copy of the relationship into the second knowledge base.

8. A computer implemented method according to claim 7 in which each matched concept in the second knowledge base is associated with a position identifier that indicates the position in the software or other structured data at which the concept was matched in accordance with the matching rules.

9. A computer implemented method according to claim 7 further comprising the step of associating each concept and each relationship in the or each sub-set of concepts and relationships with an indication of belief dependent on the degree of matching tat occurred in the respective matching step.

10. A computer implemented method of extracting knowledge from software code or other structured data, the method comprising:

inspecting a first knowledge base having knowledge being represented by a set of two or more concepts and of one or more relationships of a first type between two or more of said concepts, the first knowledge base being produced by:
 a) dividing the set of concepts into a plurality of sub-sets, each sub-set comprising a set of concepts related to a sub-set of the knowledge;
 b) dividing the relationships among the sub-sets of concepts; and
 c) providing a further set comprising all the concepts along with a second type of relationship that provides an association between each concept in the further set of concepts and one or more of the sub-sets of concepts and relationships;

building a list of all the labels for the concepts and relationships tat are present in the first knowledge base;

taking each label for a concept from the list in turn and matching the label in accordance with a set of rules against elements of the software code or other structured data;

for each match found, entering a copy of the concept into a second knowledge base having the same basic structure as the first knowledge base;

taking each Label for a relationship from the list in turn and matching the label in accordance with a set of rules against elements of the software code or other structured data;

for each match found, entering a copy of the relationship into the second knowledge base; and associating in the further set of concepts and relationships an indication of authenticity of each of the sub-sets of concepts and relationships, the authenticity being initially set to a predetermined value.

11. A computer implemented method of pre-processing software code or other structured data, which data has been created using a plurality of different styles, said pre-processing method comprising the steps of:

scanning the software, code or other structured data for one or more style determined elements;

logging each style determined element and its relative position;

analysing the logged style determined elements and associating sections of the software code or other structured data having common style determined elements; and selecting one of the associations of style determined elements for processing in accordance with a method of extracting knowledge from said software code or said other structured data, the method of extracting comprising:

inspecting a first knowledge base having knowledge being represented by a set of two or more concepts and of one or more relationships of a first type between two or more of said concepts, the first knowledge base being produced by:
 a) dividing the set of concepts into a plurality of sub-sets, each sub-set comprising a set of concepts related to a sub-set of the knowledge;
 b) dividing the relationships among the sub-sets of concepts; and
 c) providing a further set comprising all the concepts along with a second type of relationship that provides an association between each concept in the further set of concepts and one or more of the sub-sets of concepts and relationships;

building a list of all the labels for the concepts and relationships that are present in the first knowledge base;

taking each label for a concept from the list in turn and matching the label in accordance with a set of rules against elements of the software code or other structured data;

for each match found, entering a copy of the concept into a second knowledge base having the same basic structure as the first knowledge base;

taking each label for a relationship from the list in turn and matching the label in accordance with a set of rules against elements of the software code or other structured data; and for each match found, entering a copy of the relationship into the second knowledge base.

12. A computer implemented method of pre-processing software code or other structured data, which data is divided into a plurality sections, said pre-processing method comprising the steps of:

scanning each section of the software code or other structured data for one or more predetermined elements;

measuring the density of each predetermined element in each section; and selecting, in dependence on the density measurement, one of the sections for processing in accordance with method extracting knowledge from said software code or said other structured data, the method of extracting comprising:

inspecting a first knowledge base having knowledge being represented by a set of two or more concepts and of one or more relationships of a first type between two or more of said concepts, the first knowledge base being produced by:
 a) dividing the set of concepts into a plurality of sub-sets, each sub-set comprising a set of concepts related to a sub-set of the knowledge;

b) dividing the relationships among the sub-sets of concepts; and c) providing a further set comprising all the concepts along with a second type of relationship that provides an association between each concept in the further set of concepts and one or more of the sub-sets of concepts and relationships;

building a list of all the labels for the concepts and relationships that are present in the first knowledge base;

taking each label for a concept from the list in turn and matching the label in accordance with a set of rules against elements of the software code or other structured data;

for each match found, entering a copy of the concept into a second knowledge base having the same basic structure as the first knowledge base;

taking each label for a relationship from the list in turn and matching the label in accordance with a set of rules against elements of the software code or other structured data; and for each match found, entering a copy of the relationship into the second knowledge base.

13. A computer program storage device readable by a computer or combination of computers, tangibly embodying a program or a suite of programs, executable by the computer or combination of computers to carry out the method according to claim 1.

14. A computer implemented method for representing knowledge in a two-layer network, the knowledge being represented by a set of two or more concepts and of one or more relationships of a first type between two or more of said concepts, the method comprising:

tangibly embodying a concrete semantic network on a computer readable storage device as one layer of the two-layer network by dividing the set of concepts into a plurality of slices, each slice comprising a set of concepts related to a slice of the knowledge, and dividing the relationships among the slices of concepts; and tangibly embodying an abstract semantic network on a computer readable storage device as another layer of the two-layer network, the abstract semantic network comprising all the concepts along with a relationship of a second type that provides an association between each concept in the abstract semantic network and one or more of the slices of concepts and relationships.

15. A two-layer computer network for representing knowledge as a set of two or more concepts and of one or more relationships of a first type between two or more of said concepts, the two-layer computer network comprising:

a concrete semantic network tangibly embodied on a computer readable storage device as one layer of the two-layer network, the concrete semantic network including a set of concepts divided into a plurality of sub-sets, each sub-set comprising a set of concepts related to a sub-set of the knowledge, and the relationships being divided among the sub-sets of concepts; and an abstract semantic network tangibly embodied on a computer readable storage device as another layer of the two-layer network, the abstract semantic network comprising all the concepts along with a relationship of a second type that provides an association between each concept in the abstract semantic network and one or more of the sub-sets of concepts and relationships.

* * * * *